United States Patent
Lee et al.

(10) Patent No.: US 11,840,596 B2
(45) Date of Patent: Dec. 12, 2023

(54) CATALYST COMPOSITION AND METHOD FOR PREPARING POLYOLEFIN USING THE SAME

(71) Applicant: LG Chem, Ltd., Seoul (KR)

(72) Inventors: Seungmi Lee, Daejeon (KR); Ki Soo Lee, Daejeon (KR); Hyun Jee Kwon, Daejeon (KR); Poeun Kim, Daejeon (KR); Yongwoo Kwon, Daejeon (KR)

(73) Assignee: LG Chem, Ltd.

(*) Notice: Subject to any disclaimer, the term of this patent is extended or adjusted under 35 U.S.C. 154(b) by 34 days.

(21) Appl. No.: 16/972,280

(22) PCT Filed: Feb. 20, 2020

(86) PCT No.: PCT/KR2020/002464
§ 371 (c)(1),
(2) Date: Dec. 4, 2020

(87) PCT Pub. No.: WO2020/171620
PCT Pub. Date: Aug. 27, 2020

(65) Prior Publication Data
US 2021/0238317 A1    Aug. 5, 2021

(30) Foreign Application Priority Data

Feb. 20, 2019  (KR) .................. 10-2019-0020024
Feb. 20, 2020  (KR) .................. 10-2020-0020903

(51) Int. Cl.
| | |
|---|---|
| C08F 4/6592 | (2006.01) |
| C08F 4/653 | (2006.01) |
| C08F 210/16 | (2006.01) |
| C08L 23/08 | (2006.01) |
| C07F 7/00 | (2006.01) |
| C08F 4/52 | (2006.01) |
| C08F 4/659 | (2006.01) |
| C08F 110/02 | (2006.01) |

(52) U.S. Cl.
CPC ............ *C08F 4/65925* (2013.01); *C07F 7/00* (2013.01); *C08F 4/52* (2013.01); *C08F 4/65904* (2013.01); *C08F 4/65912* (2013.01); *C08F 4/65916* (2013.01); *C08F 110/02* (2013.01); *C08F 2420/07* (2021.01); *C08F 2500/08* (2013.01); *C08F 2500/12* (2013.01); *C08F 2500/18* (2013.01); *C08L 23/0815* (2013.01)

(58) Field of Classification Search
CPC ............ C08F 4/65904; C08F 4/65925; C08F 210/16
See application file for complete search history.

(56) References Cited

U.S. PATENT DOCUMENTS

| | | | |
|---|---|---|---|
| 7,989,670 B2 | 8/2011 | Wu et al. | |
| 8,207,390 B2 | 6/2012 | Wu et al. | |
| 8,748,361 B2 | 6/2014 | Wu et al. | |
| 9,234,150 B2 | 1/2016 | Martin et al. | |
| 9,234,151 B2 | 1/2016 | Martin et al. | |
| 9,234,152 B2 | 1/2016 | Martin et al. | |
| 9,365,788 B2 | 6/2016 | Emett et al. | |
| 9,399,746 B2 | 7/2016 | Emett et al. | |
| 9,409,834 B2 | 8/2016 | Wu et al. | |
| 9,796,645 B2 | 10/2017 | Emett et al. | |
| 9,809,667 B2 | 11/2017 | Lue et al. | |
| 9,850,332 B2 | 12/2017 | Lue et al. | |
| 9,879,106 B2 | 1/2018 | Rix et al. | |
| 9,902,790 B2 | 2/2018 | Vanderlende et al. | |
| 9,932,426 B2 | 4/2018 | Rix et al. | |
| 10,189,923 B2 | 1/2019 | Lue et al. | |
| 10,239,977 B2 | 3/2019 | Rix et al. | |
| 10,253,121 B2 | 4/2019 | Boller et al. | |
| 10,308,742 B2 | 6/2019 | Lue et al. | |
| 10,392,456 B2 | 8/2019 | Rix et al. | |
| 10,421,829 B2 | 9/2019 | Rix et al. | |
| 10,508,164 B2 | 12/2019 | Kwon et al. | |
| 10,604,606 B2 | 3/2020 | Rix et al. | |
| 2005/0148744 A1 | 7/2005 | Kao | |
| 2005/0159300 A1* | 7/2005 | Jensen ................ | C08F 10/02 502/103 |

(Continued)

FOREIGN PATENT DOCUMENTS

| | | |
|---|---|---|
| EP | 3845690 A1 | 7/2021 |
| JP | 2001525457 A | 12/2001 |

(Continued)

OTHER PUBLICATIONS

International Search Report for Application No. PCT/KR2020/002464 dated Jun. 9, 2020, 2 pages.
Lee, et al., "Polymerization of Ethylene Initiated with Trisiloxane-bridged Heterometallic Dinuclear Metallocene," Korea Polymer Journal, Aug. 25, 2000, pp. 238-242, vol. 8. No. 5.
Extended European Search Report for EP Application No. 20760310.1 dated Dec. 16, 2021, 2 pgs.

(Continued)

*Primary Examiner* — Caixia Lu
(74) *Attorney, Agent, or Firm* — Lerner David LLP

(57) ABSTRACT

A catalyst composition, a method of preparing a polyolefin including the same, and a polyolefin prepared from the same are disclosed herein. In some embodiments, a catalyst composition comprises a first transition metal compound represented by Chemical Formula 1, and a second transition metal compound represented by Chemical Formula 2, wherein a molar ratio of the first transition compound to the second transition metal compound ranges from 1:0.3 to 1:3.5. The catalyst composition is capable of preparing a polyolefin having excellent mechanical stability, while exhibiting excellent process stability and high polymerization activity during the preparation of a polyolefin in a slurry process.

8 Claims, No Drawings

(56) References Cited

U.S. PATENT DOCUMENTS

| | | | |
|---|---|---|---|
| 2005/0171283 A1* | 8/2005 | Szul | C08J 5/18 525/191 |
| 2007/0043248 A1 | 2/2007 | Wu et al. | |
| 2008/0146755 A1* | 6/2008 | Hamed | C08F 10/02 526/112 |
| 2012/0172548 A1 | 7/2012 | Cho et al. | |
| 2015/0284490 A1 | 10/2015 | Nagy et al. | |
| 2016/0347874 A1 | 12/2016 | Boller et al. | |
| 2016/0347890 A1 | 12/2016 | Kao et al. | |
| 2016/0362510 A1 | 12/2016 | Rix et al. | |
| 2018/0016372 A1 | 1/2018 | Kwon et al. | |
| 2019/0040167 A1 | 2/2019 | Holtcamp et al. | |
| 2019/0177452 A1 | 6/2019 | Boller et al. | |
| 2019/0263953 A1 | 8/2019 | Li et al. | |
| 2019/0322780 A1 | 10/2019 | Rix et al. | |
| 2019/0367650 A1 | 12/2019 | Rix et al. | |

FOREIGN PATENT DOCUMENTS

| | | |
|---|---|---|
| JP | 2007518871 A | 7/2007 |
| JP | 2009503147 A | 1/2009 |
| JP | 2015113282 A | 6/2015 |
| JP | 2017506281 A | 3/2017 |
| KR | 101618460 B1 | 5/2016 |
| KR | 20170075224 A | 7/2017 |
| KR | 20170076550 A | 7/2017 |
| KR | 101835993 B1 | 4/2018 |
| WO | 199929737 A1 | 6/1999 |
| WO | 2001009200 A1 | 1/2001 |
| WO | 2001098372 A2 | 12/2001 |
| WO | 2005070977 A1 | 8/2005 |
| WO | 2016003880 A1 | 1/2016 |
| WO | 2017048392 A1 | 3/2017 |

OTHER PUBLICATIONS

Partial Supplemental European Search Report for Application No. EP 20760310.1, dated Jul. 29, 2021, 15 pages.

* cited by examiner

CATALYST COMPOSITION AND METHOD FOR PREPARING POLYOLEFIN USING THE SAME

CROSS REFERENCE WITH RELATED APPLICATION(S)

The present application is a national phase entry under 35 U.S.C. § 371 of International Application No. PCT/KR2020/002464, filed on Feb. 20, 2020, which claims priority from Korean Patent Application Nos. 10-2019-0020024, filed Feb. 20, 2019, and 10-2020-0020903, filed on Feb. 20, 2020, the disclosures of which are incorporated herein by reference in their entirety.

TECHNICAL FIELD

The present disclosure relates to a catalyst composition and a method for preparing polyolefin using the same.

BACKGROUND ART

Olefin polymerization catalyst systems may be classified into Ziegler-Natta and metallocene catalysts. Among them, the metallocene catalyst consists of a combination of a main catalyst in which a transition metal compound is a main component and an organometallic compound, a cocatalyst, in which aluminum is a main component. Such a catalyst is a homogeneous complex catalyst which is a single-site catalyst. The polymer having a narrow molecular weight distribution and a uniform compositional distribution of comonomers depending on the single site characteristics can be obtained, which is characteristic that the stereoregularity, the copolymerization properties, the molecular weight, the degree of crystallinity, and so on of the polymer can be changed by varying the ligand structure of the catalyst and the polymerization conditions.

On the other hand, a linear low density polyethylene (LLDPE) and a very low density polyethylene (VLDPE) are produced by copolymerizing ethylene and alpha-olefin under a polymerization catalyst.

Conventionally, it was possible to produce a very low density polyethylene by a solution polymerization or a gas phase polymerization. In the slurry process, it was difficult to produce a very low density polyethylene due to process characteristics. The slurry process has a drawback that the copolymerizability is inferior to that of a general gas phase process, and a catalyst excellent in copolymerizability is absolutely required. In addition, the problem of solubility by the solvent and the problem of swelling of the polymer not only cause a decrease in productivity but also cause unstable processes and a fouling problem, so there is a limit in that the production of the very low density polyethylene was made difficult.

In view of the above, there is a need for a catalyst for the preparation of a very low density polyethylene which can produce a very low density polyethylene with high productivity while the process being stable even in the slurry process.

DETAILED DESCRIPTION OF THE INVENTION

Technical Problem

It is an object of the present disclosure to provide a catalyst composition capable of preparing a polyolefin having excellent mechanical stability, while exhibiting excellent process stability and high polymerization activity during the preparation of a polyolefin in a slurry process, and a method for preparing a polyolefin using the same.

Technical Solution

In one aspect of the present disclosure, there is provided a catalyst composition comprising a first transition metal compound (A) represented by the following Chemical Formula 1 and a second transition metal compound (B) represented by the following Chemical Formula 2 in a molar ratio (A:B) of 1:0.3 to 1:3.5.

[Chemical Formula 1]

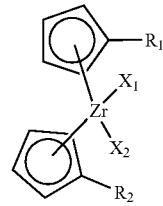

in Chemical Formula 1,
$R_1$ and $R_2$ are each independently hydrogen, halogen, $C_{1-20}$ alkyl, $C_{2-20}$ alkenyl, $C_{1-20}$ alkoxy or $C_{2-20}$ alkoxyalkyl, and
$X_1$ and $X_2$ are each independently halogen or $C_{1-20}$ alkyl,

[Chemical Formula 2]

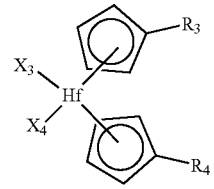

in Chemical Formula 2,
$R_3$ and $R_4$ are each independently hydrogen, halogen, $C_{1-20}$ alkyl, $C_{2-20}$ alkenyl, $C_{1-20}$ alkoxy or $C_{2-20}$ alkoxyalkyl, and
$X_3$ and $X_4$ are each independently halogen or $C_{1-20}$ alkyl.

In another aspect of the present disclosure, there is provided a method for preparing a polyolefin comprising subjecting an olefin monomer to a slurry polymerization in the presence of the above-mentioned catalyst composition.

In yet another aspect of the present disclosure, there is provided an polyethylene produced by a preparation method of a polyolefin and comprising a very low density polyethylene and a linear low density polyetherene copolymer having a density of 0.900 to 0.930 g/cm³.

Advantageous Effects

According to the present disclosure, a catalyst composition capable of preparing a polyolefin having excellent mechanical stability, while exhibiting excellent process stability and high polymerization activity during the preparation of a polyolefin in a slurry process, and a method for preparing a polyolefin using the same can be provided.

Detailed Description of the Embodiments

The terms as used herein are used only to explain illustrative examples, and are not intended to limit the present disclosure. As used herein, the singular forms "a", "an" and "the" are intended to include the plural forms as well, unless the context clearly indicates otherwise. It should be understood that as used herein, the terms "comprise", "include" or "have" and the like designate the existence of stated features, steps, constitutional elements or combinations thereof, but do not preclude the existence or addition of one or more other features, steps, constitutional elements or combinations thereof.

Although various modifications can be made to the invention and the present disclosure may have various forms, hereinafter, specific embodiments will be illustrated and explained in detail. However, it should be understood that the present disclosure is not limited to specific disclosed forms, and it includes all changes, equivalents and substitutions included in the spirit and technical scope of the present disclosure.

Hereinafter, a catalyst composition, a method for preparing a polyolefin using the same, and a polyolefin prepared therefrom according to specific embodiments of the present disclosure will be described.

According to one embodiment of the present disclosure, a catalyst composition comprising a first transition metal compound (A) represented by the following Chemical Formula 1 and a second transition metal compound (B) represented by the following Chemical Formula 2 in a molar ratio (A:B) of 1:0.3 to 1:3.5 is provided.

[Chemical Formula 1]

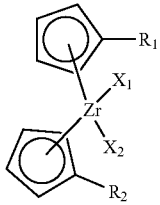

in Chemical Formula 1, $R_1$ and $R_2$ are each independently hydrogen, halogen, $C_{1-20}$ alkyl, $C_{2-20}$ alkenyl, $C_{1-20}$ alkoxy or $C_{2-20}$ alkoxyalkyl, and $X_1$ and $X_2$ are each independently halogen or $C_{1-20}$ alkyl,

[Chemical Formula 2]

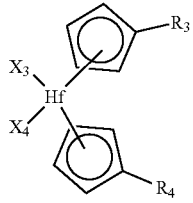

in Chemical Formula 2, $R_3$ and $R_4$ are each independently hydrogen, halogen, $C_{1-20}$ alkyl, $C_{2-20}$ alkenyl, $C_{1-20}$ alkoxy or $C_{2-20}$ alkoxyalkyl, and $X_3$ and $X_4$ are each independently halogen or $C_{1-20}$ alkyl.

According to the one embodiment, by using a precursor comprising a first transition metal compound (A) represented by Chemical Formula 1 and a second transition metal compound (B) represented by Chemical Formula 2 in a specific ratio, it is possible to produce a catalyst composition having improved copolymerizability and supporting performance as compared to the prior art.

Specifically, the catalyst composition in which the molar ratio (A:B) of the first transition metal compound and the second transition metal compound is 1:0.3 to 1:3.5 may exhibit excellent supporting performance, catalytic activity, and high copolymerizability. In particular, when preparing a very low density polyethylene in a slurry process in the presence of such a catalyst composition, it is possible to prevent the problem that a conventional very low density polyethylene melts or swells, which lowers productivity and causes fouling, thereby improving process stability. In addition, a polyolefin having excellent physical properties, for example, a very low density polyethylene, may be provided by using the catalyst composition.

On the other hand, when the molar ratio (A:B) of the first transition metal compound and the second transition metal compound is less than 1:0.3, there is a disadvantage in that as copolymerizability decreases, the preparation of the very low density polyethylene is made difficult. When the molar ratio exceeds 1:3.5, there is a problem that it is difficult to reproduce the molecular structure of a desired polymer.

In the transition metal compound included in the catalyst composition according to the one embodiment, the substituents of Chemical Formulas 1 and 2 will be described in more detail as follows.

Halogen may be fluorine (F), chlorine (Cl), bromine (Br) or iodine (I).

A $C_{1-20}$ alkyl may be linear, branched or cyclic alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be methyl, ethyl, n-propyl, iso-propyl, n-butyl, iso-butyl, tert-butyl, n-pentyl, iso-pentyl or cyclohexyl, etc.

A $C_{2-20}$ alkenyl may be linear, branched or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl or $C_{5-10}$ cyclic alkenyl. More specifically, the $C_{2-20}$ alkenyl may be ethenyl, propenyl, butenyl, pentenyl, or cyclohexenyl, etc.

A $C_{6-20}$ aryl means monocyclic, bicyclic or tricyclic aromatic hydrocarbon. Specifically, the $C_{6-20}$ aryl may be phenyl, naphthyl or anthracenyl, etc.

A $C_{7-20}$ alkylaryl means aryl of which one or more hydrogen atoms are substituted with alkyl. Specifically, the $C_{7-20}$ alkylaryl may be methylphenyl, ethylphenyl, n-propylphenyl, iso-propylphenyl, n-butylphenyl, iso-butylphenyl, tert-butylphenyl, or cyclohexylphenyl, etc.

A $C_{7-20}$ arylalkyl means alkyl of which one or more hydrogen atoms are substituted with aryl. Specifically, the $C_{7-20}$ arylalkyl may be benzyl, phenylpropyl or phenylhexyl, etc.

A $C_{1-20}$ alkoxy may be linear, branched or cyclic alkyl. Specifically, the $C_{1-20}$ alkoxy may be methoxy, ethoxy, n-butoxy, tert-butoxy, phenyloxy, cyclohexyloxy, etc., but is not limited thereto.

A $C_{2-20}$ alkoxyalkyl means a substituent in which one or more hydrogen atoms of alkyl are substituted with alkoxy. Specifically, the $C_{2-20}$ alkoxyalkyl may be methoxymethyl, ethoxymethyl, methoxyethyl, ethoxyethyl, butoxymethyl, butoxyethyl, butoxypropyl, butoxybutyl, butoxyheptyl, butoxyhexyl, etc., but is not limited thereto.

In the catalyst composition according to the one embodiment, the $R_1$ and $R_2$ in Chemical Formula 1 may be each independently $C_{4-20}$ alkyl or $C_{5-9}$ linear alkyl substituted with tert-butoxy, more preferably, the $R_1$ and $R_2$ may be each independently n-hexyl substituted with n-butyl or tert-butoxy. In addition, the $R_1$ and $R_2$ in Chemical Formula 1 may be substituted with the same substituent.

The $X_1$ and $X_2$ in Chemical Formula 1 may be each independently chlorine or methyl, but more preferably, methyl.

Specifically, the first transition metal compound represented by Chemical Formula 1 may be a compound represented by the following Chemical Formula 1a or Chemical Formula 1b, but is not limited thereto.

[Chemical Formula 1a]

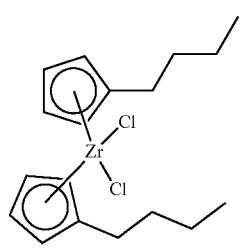

[Chemical Formula 1b]

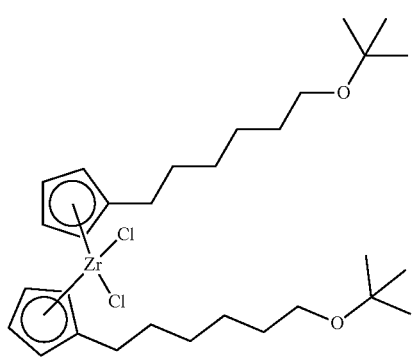

The first transition metal compound represented by the above structural formulas can be synthesized by applying known reactions, and for more detailed synthesis method, the examples described below may be referred to.

In the catalyst composition according to the one embodiment, the $R_3$ and $R_4$ in Chemical Formula 1 may be each independently $C_{1-3}$ alkyl, and more preferably, the $R_3$ and $R_4$ may be n-propyl.

The $X_3$ and $X_4$ in Chemical Formula 2 may be each independently chlorine or methyl. Further, the $X_3$ and $X_4$ may be substituted with the same substituent.

Specifically, the second transition metal compound represented by Chemical Formula 2 may be a compound represented by the following Chemical Formula 2a or Chemical Formula 2b, but is not limited thereto.

[Chemical Formula 2a]

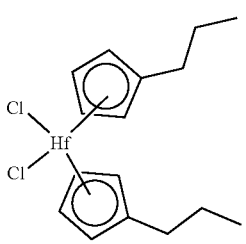

-continued

[Chemical Formula 2b]

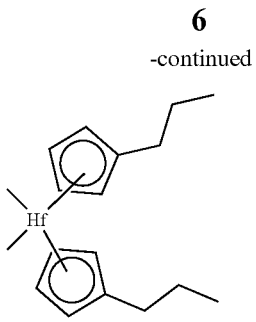

The second transition metal compound represented by the above structural formulas can be synthesized by applying known reactions, and for more detailed synthesis method, the examples described below may be referred to.

In the catalyst composition according to the one embodiment, the first transition metal compound represented by Chemical Formula 1 contributes to forming a low molecular weight linear copolymer, and the second transition metal compound represented by Chemical Formula 2 may contribute to forming a high molecular weight linear copolymer. The catalyst composition uses a first transition metal compound with low polymerizability and a second transition metal compound with high polymerizability together as a hybrid catalyst, thereby exhibiting excellent supporting performance, catalytic activity, and high copolymerizability. In particular, when preparing a very low density polyethylene by a slurry process in the presence of such a catalyst composition, the process stability can be improved to prevent fouling problems that have occurred in a conventional one. Further, a polyolefin having excellent physical properties, for example, a very low density polyethylene, may be provided by using the catalyst composition.

Meanwhile, the catalyst composition according to the one embodiment may further include a support supporting the first transition metal compound and the second transition metal compound.

As the support, a support containing a hydroxy group or a siloxane group on the surface may be used. Specifically, as the support, supports that are dried at high temperature to remove moisture on the surface, thus containing highly reactive hydroxy groups or siloxanes groups may be used. More specifically, as the support, silica, alumina, magnesia or a mixture thereof may be used. The support may be dried at high temperature, and commonly comprise oxide, carbonate, sulfate, nitrate components such as $Na_2O$, $K_2CO_3$, $BaSO_4$ and $Mg(NO_3)_2$, etc.

The drying temperature of the support is preferably 40 to 800° C., more preferably 100 to 600° C., and most preferably 100 to 300° C. If the drying temperature of the support is less than 40° C., it remains an excess of water and thus surface moisture may react with the cocatalyst; whereas if the drying temperature is greater than 800° C., pores on the support surface may be combined together to reduce the surface area, and also a lot of hydroxy groups may be lost on the surface and only siloxane groups may remain, thus decreasing the reaction sites with the cocatalyst, which is not preferable.

The amount of the hydroxyl groups on the support surface may be preferably 0.1 to 10 mmol/g, more preferably 0.5 to 5 mmol/g. The amount of the hydroxyl groups on the support surface may be controlled by the preparation method and conditions of support, or drying conditions, for example, temperature, time, vacuum or spray drying and the like.

If the amount of the hydroxyl groups are less than 0.1 mmol/g, the reaction sites with the cocatalyst may be little, and if it is greater than 10 mmol/g, there is a possibility of being derived from moisture other than hydroxyl groups existing on the support particle surface, which is not preferable.

The catalyst composition according to the one embodiment may further include a cocatalyst for activating the transition metal compound which is a catalyst precursor. The cocatalyst is an organometallic compound containing a Group 13 metal, and is not particularly limited as long as it can be used when polymerizing an olefin under a general metallocene catalyst. Specifically, the cocatalyst may be at least one compound selected from the group consisting of compounds represented by the following Chemical Formulas 3 to 5.

$$R_6—[Al(R_5)—O]_n—R_7 \quad \text{[Chemical Formula 3]}$$

in Chemical Formula 3, $R_5$, $R_6$ and $R_7$ are each independently hydrogen, halogen, a $C_{1-20}$ hydrocarbyl group, or a $C_{1-20}$ hydrocarbyl group substituted with halogen, and n is an integer of 2 or more, $$D(R_8)_3 \quad \text{[Chemical Formula 4]}$$

in Chemical Formula 4,

D is aluminum or boron, and each $R_8$ is independently halogen, a $C_{1-20}$ hydrocarbyl group, a $C_{1-20}$ hydrocarbyloxy group, or a $C_{1-20}$ hydrocarbyl group substituted with halogen, $$[L-H]^+[W(A)_4]^- \text{ or } [L]^+[W(A)_4]^- \quad \text{[Chemical Formula 5]}$$

in Chemical Formula 5,

L is neutral or cationic Lewis base,

H is a hydrogen atom,

W is a Group 13 atom, and each A is independently one of a $C_{1-20}$ hydrocarbyl group; a $C_{1-20}$ hydrocarbyloxy group; and substituents in which at least one hydrogen atom of the above substituents is substituted with at least one substituent selected among halogen, a $C_{1-20}$ hydrocarbyloxy group and a $C_{1-20}$ hydrocarbyl(oxy)silyl group.

Unless specifically limited herein, the following terms may be defined as follows.

A hydrocarbyl group is a monovalent functional group in which hydrogen atom is removed from hydrocarbon, and it may include an alkyl group, an alkenyl group, an alkynyl group, an aryl group, an aralkyl group, an aralkenyl group, an aralkynyl group, an alkylaryl group, an alkenylaryl group, and an alkynylaryl group, etc. And, a $C_{1-20}$ hydrocarbyl group may be a $C_{1-15}$ or $C_{1-10}$ hydrocarbyl group. Specifically, a $C_{1-20}$ hydrocarbyl group may be a linear, branched or cyclic alkyl group such as a methyl group, an ethyl group, an n-propyl group, an iso-propyl group, an an-butyl group, an iso-butyl group, a tert-butyl group, an n-pentyl group, an n-hexyl group, an n-heptyl group, a cyclohexyl group, etc.; or an aryl group such as a phenyl group, a naphthyl group, an anthracenyl group, etc.

A hydrocarbyloxy group is a functional group in which a hydrocarbyl group is bonded to oxygen. Specifically, a $C_{1-20}$ hydrocarbyloxy group may be a $C_{1-15}$ or $C_{1-10}$ hydrocarbyloxyl group. More specifically, a $C_{1-20}$ hydrocarbyloxy group may be a linear, branched or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexoxy group an n-heptoxy group, a cyclohexoxy group, etc.; or an aryloxy group such as a phenoxy group, a naphthaleneoxy group, etc.

A hydrocarbyl(oxy)silyl group is a functional group in which 1 to 3 hydrogen atoms of —$SiH_3$ are substituted with 1 to 3 hydrocarbyl groups or hydrocarbyloxy groups. Specifically, a $C_{1-20}$ hydrocarbyl(oxy)silyl group may be a $C_{1-15}$, $C_{1-10}$, or $C_{1-5}$ hydrocarbyl(oxy)silyl group. More specifically, a $C_{1-20}$ hydrocarbyl(oxy)silyl group may be an alkylsilyl group such as a methylsilyl group, a dimethylsilyl group, a trimethylsilyl group, a dimethylethylsilyl group, a diethylmethylsilyl group, a dimethylpropylsilyl group, etc.; an alkoxysilyl group such as a methoxysilyl group, a dimethoxysilyl group, a trimethoxysilyl group, a dimethoxyethoxysilyl group, etc.; or an alkoxyalkylsilyl group such as a methoxydimethylsilyl group, a diethoxymethylsilyl group, a dimethoxypropylsilyl group, etc.

Non-limiting examples of the compounds represented by the Chemical Formula 3 may include methylaluminoxane, ethylaluminoxane, isobutylaluminoxane, or tert-butylaluminoxane, etc. And, non-limiting examples of the compounds represented by the Chemical Formula 4 may include triethylaluminum, triethylaluminum, triisobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, etc. Finally, non-limiting examples of the compounds represented by the Chemical Formula 5 may include trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecylanilinium tetrakis(pentafluorophenyl)borate or methyldi(dodecyl)ammonium tetrakis(pentafluorophenyl)borate, etc.

The amount of the cocatalyst used may be appropriately adjusted according to the physical properties or effects of the desired catalyst composition.

The catalyst composition according to the one embodiment can be produced by a process including a step of supporting a cocatalyst on the support, and a step of supporting the above-mentioned first and second transition metal compounds, which are catalyst precursors, on the cocatalyst-supported support.

Specifically, in the step of supporting the cocatalyst on the support, a cocatalyst-supported support can be prepared by adding a cocatalyst to a support dried at high temperature and stirring it at a temperature of about 20 to 120° C.

And, in the step of supporting the catalyst precursor on the cocatalyst-supported support, a supported catalyst can be produced by adding the first and second transition metal compounds to the cocatalyst-supported support obtained in the step of supporting the cocatalyst on the support, and again stirring the mixture at a temperature of about 20 to 120° C.

In the step of supporting the catalyst precursor on the cocatalyst-supported support, a supported catalyst can be produced by adding the first and second transition metal compounds to the cocatalyst-supported support, stirring the mixture, and then further adding the cocatalyst.

The content of the support, the cocatalyst, the cocatalyst-supported support, and the transition metal compound used in the catalyst composition according to the one embodiment may be appropriately adjusted depending on the physical properties or effects of the desired supported catalyst.

Specifically, in the catalyst composition, a molar ratio of the first transition metal compound and the second transition metal compound may be 1:0.3 to 1:3.5. By containing the first and second transition metal compounds in the above-mentioned mixing molar ratio, it is possible to exhibit excellent supporting performance, catalytic activity and high copolymerizability. In particular, when producing a very low density polyethylene by a slurry process in the presence of such a catalyst composition, the process stability can be improved to prevent fouling problems that have occurred in a conventional one. In addition, a polyolefin having excellent physical properties, for example, a very low density polyethylene, may be provided by using the catalyst composition.

On the other hand, if the molar ratio (A:B) of the first transition metal compound and the second transition metal compound is less than 1:0.3, There is a disadvantage that as the copolymerizability decreases, the preparation of the very low density polyethylene is made difficult. If the molar ratio exceeds 1:3.5, there is a problem that it is difficult to reproduce the molecular structure of the desired polymer.

At this time, the supporting amount of the metallocene compound supported on the silica support by the above step may be 0.01 to 1 mmol/g based on 1 g of the support. That is, in consideration of the effects of the catalyst due to the metallocene compound, it is preferable to control the supporting amount so as to correspond to the above-mentioned range.

As a reaction solvent during the production of the hybrid-supported catalyst, a hydrocarbon solvent such as pentane, hexane, and heptane; alternatively, an aromatic solvent such as benzene or toluene may be used.

For more specific method for producing the supported catalyst, the examples described below can be referred to. However, the preparation method of the supported catalyst is not limited to the content described herein, and the preparation method may further adopt a step that is ordinarily adopted in the technical field to which the present disclosure belongs. The step(s) of the preparation method may be modified by a generally changeable step(s).

According to yet another embodiment, there is provided a method for producing a polyolefin comprising the step of subjecting an olefin monomer to slurry polymerization in the presence of the catalyst composition.

The above-mentioned catalyst composition may exhibit excellent supporting performance, catalytic activity, and high copolymerizability, and even if a low density polyethylene is produced by the slurry process in the presence of such a catalyst composition, it is possible to prevent the deterioration in productivity and the fouling-related problems in the conventional one, and improve the process stability.

The method for producing the polyolefin may be performed by a method of slurry polymerization using an olefin monomer including ethylene and comonomer as a raw material in the presence of the above-mentioned catalyst composition and applying a conventional device and a contact technology.

The preparation method of the polyolefin may copolymerize ethylene and a comonomer using a continuous slurry polymerization reactor, a loop slurry reactor, and the like, but is not limited thereto.

As the comonomer, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eitocene, and the like can be used.

In the method for producing a polyolefin according to the other embodiment, for example, 1-hexene can be used as a comonomer. Thus, in the slurry polymerization, the ethylene and 1-hexene may be polymerized to produce a very low density polyethylene copolymer.

The polymerization reaction may be carried out by homopolymerizing one olefin-based monomer or by copolymerizing two or more monomers, using a continuous slurry polymerization reactor, a loop slurry reactor, a gas phase reactor, or a solution reactor The polymerization of the olefin-based monomer can be performed by reacting at a temperature of about 25 to about 500° C. and a reaction pressure of about 1 to about 100 kgf/cm$^2$ for about 1 to about 24 hours. Specifically, the polymerization of the olefin-based monomer may be performed at a temperature of about 25 to about 500° C., preferably about 25 to about 200° C., more preferably about 50 to about 100° C. In addition, the reaction pressure can be at about 1 to about 100 kgf/cm$^2$, preferably about 1 to about 60 kgf/cm$^2$, more preferably about 5 to about 45 kgf/cm$^2$.

Further, in the slurry polymerization, the catalyst composition may be used while being dissolved or diluted in a solvent such as pentane, hexane, heptanes, nonane, decane, toluene, benzene, dichloromethane, chlorobenzene, etc. In this case, the solvent may be treated with a small amount of alkylaluminium, etc., thus removing a small amount of water or air, etc. that may have a bad influence on the catalyst in advance.

Further, if necessary, the slurry polymerization may be performed under hydrogenation or non-hydrogenation conditions.

According to another embodiment of the present disclosure, there is provided a polyolefin produced by the above-mentioned method for producing the polyolefin.

The method for producing the polyolefin can provide a polyolefin having excellent mechanical properties by performing a slurry polymerization in the presence of the above-mentioned catalyst composition, In particular, when preparing a low density polyolefin by the slurry polymerization, the above-mentioned catalyst composition allows provision of a polyolefin having excellent mechanical properties while preventing the degradation in productivity and the fouling-related problems which have occurred in a conventional one. Thus, the polyolefin may include a very low density polyethylene, and the very low density polyethylene may exhibit a density of 0.900 to 0.915 g/cm 3.

Further, the polyolefin may have a melt index (MI, 190° C., 2.16 kg) of 0.5 to 2.5 g/10 min, 0.6 to 2.2 g/10 min, or 0.8 to 2.0 g/10 min.

Further, the polyolefin may have a bulk density (BD) of 0.2 to 0.5 g/ml, 0.25 to 0.45 g/ml, or 0.3 to 0.43 g/ml.

Further, the polyolefin may have a weight average molecular weight of 50,000 to 200,000.

Further, the polyolefin may have a polydispersity index (PDI) of 2.0 to 4.0.

Therefore, even though the polyolefin has a relatively wide molecular weight distribution, it can control the molecular structure and exhibit high mechanical properties. For example, the polyolefin has a wide molecular weight distribution but may have a drop impact strength of 1000 g or more, or 1150 g or more, based on ASTM D 1709.

Thus, the polyolefin prepared by the above preparation method can be used for various applications that require these physical properties, especially, it can be used for agriculture/industry and packaging that require high drop impact strength. It can also be used for stretch films where the application of conventional low density polyethylene or high density polyethylene is difficult.

Hereinafter, the actions and effects of the present disclosure will be explained in more detail with reference to specific examples. However, these examples are presented only as the illustration of the invention and the scope of the present disclosure is not limited thereto.

Example 1: Preparation of Hybrid Supported Catalyst

Silica (SP952 produced by Grace Davison) was dehydrated and dried under vacuum at a temperature of 200° C. for 12 hours.

3.0 kg of toluene solution was added to a 20 L sus autoclave reactor to which 1,000 g of dried silica (SP952X produced by Grace Davison) was added, followed by stirring while raising the reactor temperature up to 40° C. After silica was sufficiently dispersed for 60 minutes, 8 kg of 10 wt % methyl aluminoxane (MAO)/toluene solution was added to the reactor and the mixture was stirred at 200 rpm for 12 hours. After raising the reactor temperature up to 60° C., 0.01 mmol of the compound represented by Chemical Formula 1b was dissolved in a solution state, added and then reacted for 2 hours. Then, 0.01 mmol of the compound represented by Chemical Formula 2a was dissolved in a solution state, added and then further reacted for 2 hours. Then, the stirring was stopped, settling was carried out for 30 minutes and then the toluene solution was subjected to decantation. 3.0 kg of hexane was added to the reactor and the hexane slurry was transferred to the filter dry and the hexane solution was filtered. The filtrate was dried at 50° C. under reduced pressure for 4 hours to produce a supported catalyst.

Example 2: Preparation of Hybrid Supported Catalyst

A hybrid supported catalyst were prepared in the same manner as in Example 1, except that 0.01 mmol of the compound represented by Chemical Formula 1b and 0.003 mmol of the compound represented by Chemical Formula 2a were used instead of 0.01 mmol of the compound represented by Chemical Formula 1 b and 0.01 mmol of the compound represented by Chemical Formula 2a in Example 1.

Example 3: Preparation of Hybrid Supported Catalyst

A hybrid supported catalyst were prepared in the same manner as in Example 1, except that 0.01 mmol of the compound represented by Chemical Formula 1b and 0.035 mmol of the compound represented by Chemical Formula 2a were used instead of 0.01 mmol of the compound represented by Chemical Formula 1 b and 0.01 mmol of the compound represented by Chemical Formula 2a in Example 1.

Comparative Examples 1 and 2: Preparation of Supported Catalyst

Silica (SP952 produced by Grace Davison) was dehydrated and dried under vacuum at a temperature of 200° C. for 12 hours.

3.0 kg of toluene solution was added to a 20 L sus autoclave reactor to which 1,000 g of dried silica (SP952X produced by Grace Davison) was added, followed by stirring while raising the reactor temperature up to 40° C. After silica was sufficiently dispersed for 60 minutes, 8 kg of 10 wt % methyl aluminoxane (MAO)/toluene solution was added to the reactor and the mixture was stirred at 200 rpm for 12 hours. After raising the reactor temperature up to 60° C., 0.08 mmol of the following transition metal compound C was dissolved in a solution state, added and then reacted for 2 hours. Then, the stirring was stopped, settling was carried out for 30 minutes and then the toluene solution was subjected to decantation. 3.0 kg of hexane was added to the reactor and the hexane slurry was transferred to the filter dry and the hexane solution was filtered. The filtrate was dried at 50° C. under reduced pressure for 4 hours to produce a supported catalyst.

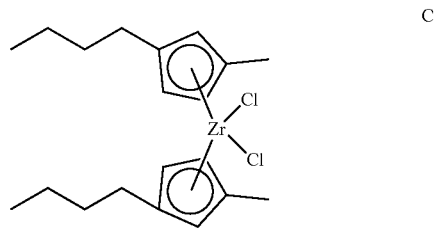

Comparative Example 3: Preparation of Hybrid Supported Catalyst

A hybrid supported catalyst were prepared in the same manner as in Example 1, except that 0.01 mmol of bis[1-(p-dimethylaminophenyl)-3,4-dimethylcyclopentadienyl] zirconium dichloride ([1-([1-(p-Me$_2$NC$_6$H$_4$)-3,4-Me$_2$C$_5$H$_2$]$_2$ZrCl$_2$) and 0.01 mmol of bis[1-(p-dimethylaminophenyl)-3,4-dimethylcyclopentadienyl]hafnium dichloride ([1-(p-Me$_2$NC$_6$H$_4$)-3,4-Me$_2$C$_5$H$_2$]$_2$HfCl$_2$) were used instead of the compound represented by Chemical Formula 1 b and the compound represented by Chemical Formula 2a in Example 1.

Test Example: Preparation of Polyethylene

Under the conditions as shown in Table 1 below, ethylene and 1-hexene were subjected to slurry polymerization in the presence of each of the supported catalysts prepared in the Examples and Comparative Examples to prepare polyethylene.

At this time, the polymerization reactor was operated by a continuous polymerization system that is an isobutane slurry loop process, with a reactor volume of 140 L, and a reaction flow rate of about 7 m/s. The gas stream (ethylene, hydrogen) and comonomer 1-hexene required for the polymerization were constantly and continuously added, and individual flow rates were adjusted to suit the target product. The concentrations of all gas streams and comonomer 1-hexene were confirmed on on-line gas chromatograph. The supported catalyst was charged into an isobutane slurry, the reactor pressure was maintained at about 40 bar, and the polymerization temperature was about 85° C.

TABLE 1

| | Catalyst | Ethylene (kg/h) | 1-Hexene (wt %) | Ethylene (mol %) | C6/C2 |
|---|---|---|---|---|---|
| Test Example 1 | Example 1 | 25.2 | 12.0 | 5.9 | 0.25 |
| Test Example 2 | Example 1 | 25.1 | 16.0 | 6.0 | 0.30 |
| Test Example 3 | Example 1 | 25.0 | 16.5 | 6.1 | 0.31 |
| Test Example 4 | Example 2 | 25.0 | 13.0 | 6.0 | 0.28 |
| Test Example 5 | Example 3 | 25.0 | 12.0 | 5.9 | 0.23 |
| Test Comparative Example 1 | Comparative Example 1 | 25.2 | 16.0 | 6.6 | 0.66 |
| Test Comparative Example 2 | Comparative Example 2 | 24.8 | 11.5 | 6.2 | 0.53 |
| Test Comparative Example 3 | Comparative Example 3 | 25.0 | 15.0 | 6.5 | 0.64 |

C6/C2: molar ratio of 1-hexene to ethylene in the slurry reactor

Test Example: Evaluation of the Activity, Process Stability, and Physical Properties of the Polyolefin of the Hybrid Supported Catalyst The catalytic activity, process stability, and physical properties of the polyolefin of the Examples and Comparative Examples were measured by the following methods, and the results are shown in Table 2 below.

(1) Catalytic Activity (Kg PE/g $SiO_2$)

It was calculated as the ratio of the weight of the polymer produced (kg PE) per catalyst content (g Cat) used per unit time (h).

(2) Melt Index of Polymer (MI 2.16)

The melt index (MI2.16) was measured at 190° C. under a load of 2.16 kg according to ASTM D 1238, and expressed by the weight (g) of the polymer melted and discharged for 10 minutes.

(3) Density

The density was measured according to ASTM D-792.

(4) BD (Bulk Density)

The bulk Density was measured according to ASTM D1895.

(5) Whether Fouling Occurs

In the process of preparing a polyolefin, it was confirmed whether or not a fouling phenomenon in which a solid product or the like was entangled and adhered to the inside of the reactor and the wall surface occurred, and the results are shown in Table 2 below.

(6) Drop Impact Strength

The drop impact strength was determined by measuring 20 or more times per film sample based on ASTM D 1709.

TABLE 2

| | Catalyst | Activity (KgPE/ gSiO$_2$) | MI2.16 (dg/min) | Density (g/cm$^3$) | BD (g/ml) | Fouling | Drop impact strength (g) |
|---|---|---|---|---|---|---|---|
| Test Example 1 | Example 1 | 6.0 | 1.14 | 0.9159 | 0.42 | X | 1150 |
| Test Example 2 | Example 1 | 6.3 | 1.07 | 0.9099 | 0.32 | X | 1590 |
| Test Example 3 | Example 1 | 6.1 | 1.12 | 0.9085 | 0.33 | X | 1650 |
| Test Example 4 | Example 2 | 6.7 | 1.05 | 0.9162 | 0.43 | X | 1130 |
| Test Example 5 | Example 3 | 5.8 | 1.01 | 0.9155 | 0.41 | X | 1240 |
| Test Comparative Example 1 | Comparative Example 1 | 4.8 | 1.14 | 0.9110 | 0.34 | O | 1200 |
| Test Comparative Example 2 | Comparative Example 2 | 4.5 | 1.05 | 0.9170 | 0.44 | X | 850 |
| Test Comparative Example 3 | Comparative Example 3 | 2.1 | 1.06 | 0.9172 | 0.32 | O | 650 |

As shown in Table 2 above, it was confirmed that in the case of Test Examples 1 to 5, despite preparation of the very low density polyethylene by a slurry process, the polymerization process is performed in the presence of the supported catalyst of the present disclosure and thus, fouling does not occur, and a very low density polyolefin having high drop impact strength is prepared. On the other hand, it was confirmed that in the case of Test Comparative Examples 1 to 3, since the other catalyst instead rather than supported catalyst of the present disclosure is used, the catalyst activity is low, the slurry process stability is greatly reduced during process of producing products in a very low density region, and thus, fouling occurs, and the drop impact strength of the film is lower compared to the similar density of the product.

The invention claimed is:

1. A catalyst composition, comprising:

a first transition metal compound represented by Chemical Formula 1; and a second transition metal compound represented by Chemical Formula 2;

wherein a molar ratio of the first transition metal compound to the second transition metal compound ranges from 1:0.3 to 1:3.5,

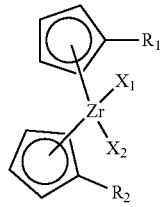

[Chemical Formula 1]

wherein in Chemical Formula 1, $R_1$ and $R_2$ are each independently $C_{5-9}$ linear alkyl substituted with tert-butoxy, and $X_1$ and $X_2$ are each independently halogen or $C_{1-20}$ alkyl,

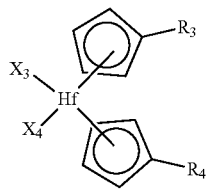

[Chemical Formula 2]

wherein in Chemical Formula 2, $R_3$ and $R_4$ are each independently $C_{1-3}$ alkyl, and $X_3$ and $X_4$ are each independently halogen or $C_{1-20}$ alkyl.

2. The catalyst composition of claim 1, wherein the first transition metal compound represented by Chemical Formula 1 is a compound represented by Chemical Formula 1b,

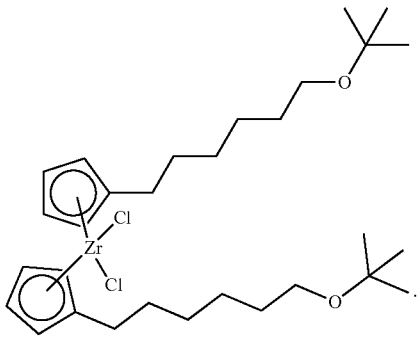

[Chemical Formula 1b]

3. The catalyst composition of claim 1, wherein the second transition metal compound represented by Chemical Formula 2 is a compound represented by Chemical Formula 2a or Chemical Formula 2b,

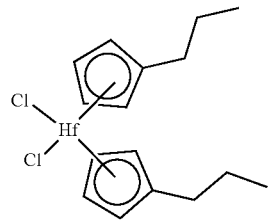

[Chemical Formula 2a]

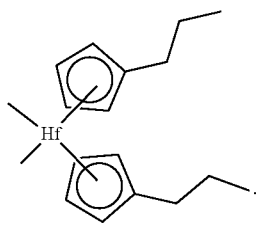

[Chemical Formula 2b]

4. The catalyst composition of claim 1, further comprising a support for supporting the first transition metal compound and the second transition metal compound.

5. The catalyst composition of claim 4, wherein the support includes any one selected from the group consisting of silica, alumina, magnesia, and a mixture of one or more thereof.

6. The catalyst composition of claim 1, further comprising at least one cocatalyst selected from the group consisting of compounds represented by Chemical Formulas 3 to 5, $$R_6\text{—}[Al(R_5)\text{—}O]_n\text{—}R_7 \quad \text{[Chemical Formula 3]}$$

wherein, in Chemical Formula 3, $R_5$, $R_6$ and $R_7$ are each independently hydrogen, halogen, a $C_{1-20}$ hydrocarbyl group, or a $C_{1-20}$ hydrocarbyl group substituted with halogen, and n is an integer of 2 or more, $$D(R_8)_3 \quad \text{[Chemical Formula 4]}$$

wherein, in Chemical Formula 4,

D is aluminum or boron, and each $R_8$ is independently halogen, a $C_{1-20}$ hydrocarbyl group, a $C_{1-20}$ hydrocarbyloxy group, or a $C_{1-20}$ hydrocarbyl group substituted with halogen, $$[L-H]^+[W(A)_4]^-  \text{ or } [L]^+[W(A)_4]^- \quad \text{[Chemical Formula 5]}$$

wherein, in Chemical Formula 5,

L is neutral or cationic Lewis base,

H is a hydrogen atom,

W is a Group 13 atom, and each A is independently one of a $C_{1-20}$ hydrocarbyl group, a $C_{1-20}$ hydrocarbyloxy group, and substituents thereof, wherein the substituents have at least one hydrogen atom substituted with at least one selected from the group consisting of halogen, a $C_{1-20}$ hydrocarbyloxy group, and a $C_{1-20}$ hydrocarbyl(oxy)silyl group.

7. A method for preparing a polyolefin, comprising:

polymerizing an olefin monomer in the presence of the catalyst composition of claim 1 to form a polyolefin.

8. The method for preparing the polyolefin of claim 7, wherein the olefin monomer includes ethylene and 1-hexene.

* * * * *